US007311790B2

(12) United States Patent
Morrison et al.

(10) Patent No.: US 7,311,790 B2
(45) Date of Patent: Dec. 25, 2007

(54) HYBRID STRUCTURE USING CERAMIC TILES AND METHOD OF MANUFACTURE

(75) Inventors: Jay A. Morrison, Oviedo, FL (US); Gary B. Merrill, Orlando, FL (US); Michael A. Burke, Pittsburgh, PA (US); Jay Edgar Lane, Murrysville, PA (US); Steven James Vance, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 650 days.

(21) Appl. No.: 10/767,013

(22) Filed: Jan. 29, 2004

(65) Prior Publication Data

US 2004/0214051 A1 Oct. 28, 2004

Related U.S. Application Data

(63) Continuation-in-part of application No. 10/423,528, filed on Apr. 25, 2003, now Pat. No. 7,198,860.

(51) Int. Cl.

*B32B 37/06* (2006.01)
*B32B 37/14* (2006.01)
*B32B 38/00* (2006.01)
*B32B 38/10* (2006.01)
*C03B 29/00* (2006.01)

(52) U.S. Cl. .................. 156/89.11; 156/153; 156/154; 156/245; 156/304.3; 156/305

(58) Field of Classification Search ............ 156/89.11, 156/245

See application file for complete search history.

(56) References Cited

U.S. PATENT DOCUMENTS 4,643,636 A 2/1987 Libertini et al.
4,790,721 A 12/1988 Morris et al.
4,907,946 A 3/1990 Ciokajlo et al.
4,928,575 A 5/1990 Smirlock et al.
4,975,225 A 12/1990 Vivaldi et al.
5,027,604 A 7/1991 Krueger
5,114,772 A * 5/1992 Vives et al. .................. 428/49
5,170,690 A 12/1992 Smirlock et al.
5,191,166 A 3/1993 Smirlock et al.
5,306,554 A 4/1994 Harrison et al.
5,314,309 A 5/1994 Blakeley et al.
5,331,816 A 7/1994 Able et al.
5,382,453 A 1/1995 Mason
5,404,793 A 4/1995 Myers
H1434 H 5/1995 Cytron (Continued)

*Primary Examiner*—Melvin Mayes

(57) ABSTRACT

A hybrid structure (50) and method of manufacturing the same including a structural ceramic matrix composite (CMC) material (42) coated with a layer of ceramic insulating tiles (24). Individual ceramic tiles are attached to a surface (22) of a mold (20). The exterior surface (32) of the tiles may be subjected to a mechanical process such as machining with the mold in place to provide mechanical support for the tiles. A layer of CMC material is then applied to bond the tiles and the CMC material together into a hybrid structure. The mold may include a fugitive material portion (26) to facilitate removal of the mold when the hybrid structure has a complex shape. Tiles located in different regions of the structure may have different compositions and/or dimensions. The gaps between adjacent tiles may be filled from the outside before the CMC material is applied or from the inside after the mold is removed.

24 Claims, 2 Drawing Sheets

U.S. PATENT DOCUMENTS

| | | | | |
|---|---|---|---|---|
| 5,484,258 | A | | 1/1996 | Isburgh et al. |
| 5,553,455 | A | * | 9/1996 | Craig et al. .................. 60/753 |
| 5,605,046 | A | | 2/1997 | Liang |
| 5,636,508 | A | | 6/1997 | Shaffer et al. |
| 5,640,767 | A | | 6/1997 | Jackson et al. |
| 5,720,597 | A | | 2/1998 | Wang et al. |
| 5,791,879 | A | | 8/1998 | Fitzgerald et al. |
| 5,824,250 | A | | 10/1998 | Whalen et al. |
| 5,962,076 | A | | 10/1999 | Mason et al. |
| 5,972,819 | A | | 10/1999 | Cohen |
| 6,013,592 | A | | 1/2000 | Merrill et al. |
| 6,132,542 | A | * | 10/2000 | Cutler et al. ............. 156/89.11 |
| 6,174,565 | B1 | | 1/2001 | Daws et al. |
| 6,197,424 | B1 | | 3/2001 | Morrison et al. |
| 6,287,511 | B1 | | 9/2001 | Merrill et al. |
| 6,325,593 | B1 | | 12/2001 | Darkins, Jr. et al. |
| 6,332,390 | B1 | | 12/2001 | Lyons |
| 6,365,281 | B1 | | 4/2002 | Subramanian et al. |
| 6,489,001 | B1 | * | 12/2002 | Cazzato et al. ............... 428/45 |
| 6,626,230 | B1 | | 9/2003 | Woodrum et al. |
| 7,198,860 | B2 | * | 4/2007 | Vance ........................ 428/701 |
| 2002/0053758 | A1 | | 5/2002 | Lombardi et al. |
| 2003/0207155 | A1 | * | 11/2003 | Morrison et al. ........... 428/699 |
| 2004/0091736 | A1 | * | 5/2004 | DiChiara, Jr. ............... 428/689 |
| 2004/0110041 | A1 | * | 6/2004 | Merrill et al. .............. 428/699 |
| 2006/0216547 | A1 | * | 9/2006 | Vance ........................ 428/697 |

* cited by examiner

HYBRID STRUCTURE USING CERAMIC TILES AND METHOD OF MANUFACTURE

This application is a continuation-in-part and claims benefit of the Apr. 25, 2003, filing date of U.S. patent application Ser. No. 10/423,528, now U.S. Pat. No. 7,198,860, incorporated by reference herein.

FIELD OF THE INVENTION

This invention relates generally to the field of materials technology, and more particularly to the field of high temperature ceramics, and in one embodiment to the field of gas turbine engines.

BACKGROUND OF THE INVENTION

It is known to apply a ceramic insulating material over the surface of a component exposed to gas temperatures that exceed the safe operating temperature range of the component substrate material. Metallic combustion turbine (gas turbine) engine parts (e.g. nickel, cobalt, iron-based alloys) are routinely coated with a ceramic thermal barrier coating (TBC).

The firing temperatures developed in combustion turbine engines continue to be increased in order to improve the efficiency of the machines. Ceramic matrix composite (CMC) materials are now being considered for applications where the temperature may exceed the safe operating range for metal components. U.S. Pat. No. 6,197,424, assigned to the present assignee, describes a gas turbine component fabricated from CMC material and covered by a layer of a dimensionally stable, abradable, ceramic insulating material, commonly referred to as friable graded insulation (FGI). Hybrid FGI/CMC components offer great potential for use in the high temperature environment of a gas turbine engine, however, the full value of such hybrid components has not yet been realized due to their relatively recent introduction to the gas turbine industry.

Combustor liners and transition ducts are gas turbine components that have a generally tubular shape defining an interior passageway through which hot combustion gasses flow. FIG. 1 is a partial perspective cut-away view of a prior art combustor 10, as described in U.S. Pat. No. 6,197,424. Such components have been formed by applying a layer of ceramic insulating material 14 to the inside surface of an annular CMC structural member 12. Such structures are difficult to manufacture due to their complex geometry, and in particular the difficulty of applying the insulating material 14 to the inside surface of the CMC structural member.

Existing methods of forming the insulating layer include casting or forming it directly to the CMC inside surface or fabricating the insulation material first and applying the CMC to the outer surface of the pre-formed insulation. In the former method, certain insulating layers such as disclosed in U.S. Pat. No. 6,197,424 require casting to thicknesses significantly greater than the final use required. This is due to the coarse grain structure, the need to cast to thicknesses 5-10 times thicker than the grain size to obtain uniform microstructures, and the difficulty in net shape casting of large thin shapes. Such thicknesses require excessive machining which may be difficult, costly, or impossible, depending on the shape. Furthermore, the large thicknesses present fabrication issues due to thick section drying and firing non-uniformities.

In the latter method, a certain amount of structural rigidity and strength are required in order to apply the CMC to the insulating layer. Typical insulating materials are quite porous (25-75% porosity) and are thus not strong or rigid enough for this purpose in their end use thicknesses (typically less than 5-8 mm thick). Thus, greater thicknesses are again required as above, with similar disadvantages as in the former method. Further disadvantage is encountered with large shapes, where forming a freestanding, self-supporting, and rigid structure becomes even more problematic (expensive tooling, detooling and handling issues, etc.)

The present invention addresses the above problems with alternative approaches, thus reducing the need for costly machining, forming of thick structures, forming of large, free-standing insulation structures, and the concomitant fabrication and handling issues.

DETAILED DESCRIPTION OF THE INVENTION

Figure 1:
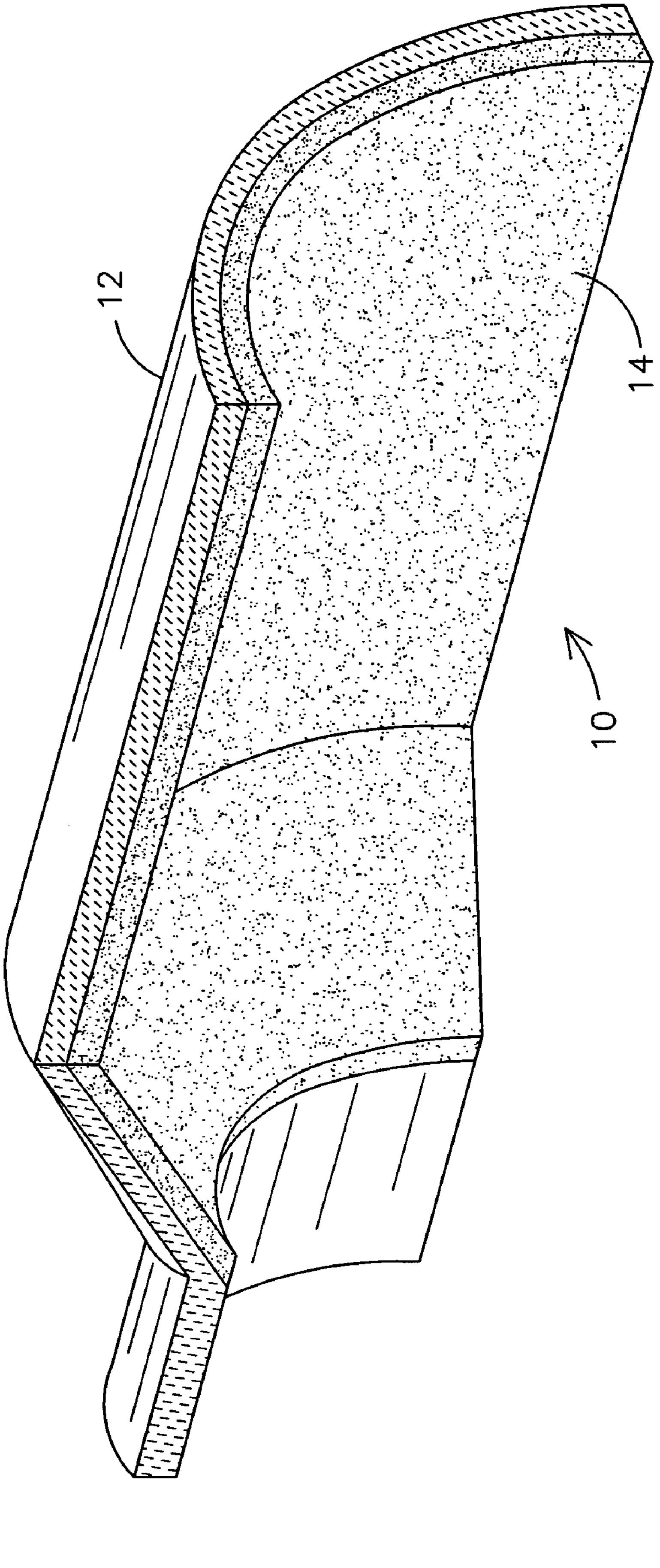
FIG. 1 PRIOR ART
FIG. 1 is a partial perspective cut-away view of a prior art combustor.
Figure 2:
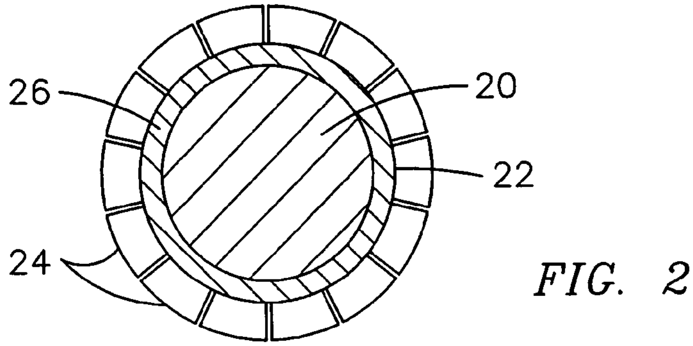
FIGS. 2 through 5 are partial cross-sectional views of a hybrid structure and tooling used to form the hybrid structure at various stages in a manufacturing process.

FIGS. 2 through 5 illustrate steps in a method that may be used to fabricate a hybrid structure 50 (illustrated in cross-section in its final form in FIG. 5) such as a gas turbine combustor or transition duct. FIG. 2 includes a partial cross-sectional view of tooling used to fabricate hybrid structure 50, in particular a mold 20 having an outside surface 22 for receiving a plurality of ceramic tiles 24. The ceramic tiles 24 may be formed of a ceramic insulating material suitable for exposure to hot combustion gasses in a gas turbine engine, such as the insulating material described in U.S. Pat. No. 6,197,424, incorporated by reference herein. The tiles may be affixed to the mold 20 by any suitable method. Such attachment methods may include:

Decomposable organic contact adhesives;

Double-sided tape layer;

Wax bonding;

Placement in a fugitive surface grid.

Such attachment materials would be considered a fugitive layer which would be removed or transformed at the appropriate stage of the processing thereby releasing the tile from the tool structure by means of melting, thermal decomposition, vaporizing, or dissolving, etc. One example involves using a low melting point fugitive material 26 on the mold 20, such as wax, and applying a preheated insulating tile to the wax surface, resulting in local melting of the wax. Upon re-solidification, the wax forms a bond to the insulating tile. Alternately, the tiles may be held to the fugitive mold material and heated in-situ. Other methods may involve the use of glues, such as epoxy, which can subsequently be burned out.

The mold 20 may have a fugitive material portion 26. The fugitive material portion 26 may form only a portion of the mold 20 such as the outside surface portion shown in FIGS. 2-4, or the entire tool may be formed of the fugitive material. As used herein, the term fugitive material includes any material that is thermally and dimensionally stable enough to support the ceramic tiles 24 through a first set of manufacturing steps, and that can then be transformed and removed by a means that does not harm the ceramic tiles 24, such as by melting, vaporizing, dissolving, leaching, crushing, abrasion, crushing, sanding, etc. In one embodiment, the fugitive material may be styrene foam that can be partially transformed and removed by mechanical abrasion and light sanding, with complete removal being accomplished by heating. Because the mold 20 contains a fugitive material portion 26, it is possible to form the hybrid structure 50 to have a large, complex shape, such as would be needed for a gas turbine combustor or transition duct, while still being able to remove the mold 20 after the tiles 24 have been affixed around the mold 20. The mold 20 may consist of hard, reusable tooling with an outer layer of fugitive material 26 of sufficient thickness to allow removal of the permanent tool after the transformation/removal of the fugitive material portion 26. The reusable tool may be formed of multiple sections to facilitate removal from complex shapes. The reusable tool may have features that allow for easy handling and for secondary operations, such as attachment to equipment that may be used to perform mechanical process such as machining, grinding, sanding or other shaping of the outside surface of the tiles 24, or measurement of the outer surface profile of the tiles 24, or application of a coating to the surface of the tiles 24, or any other necessary operation.

Figure 5:
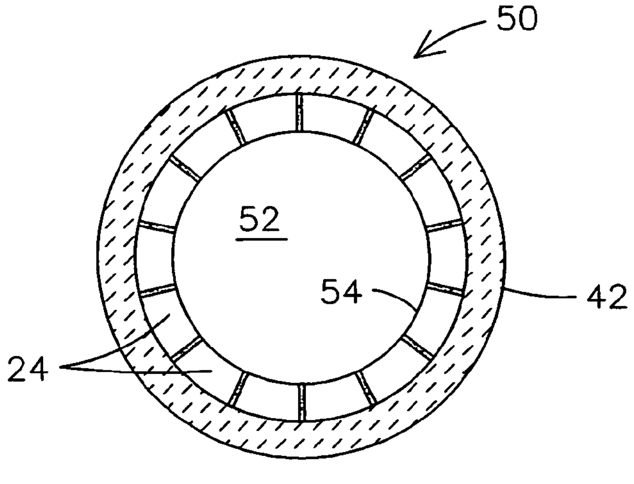

Mold 20 may be formed to define a net shape desired for a passageway 52 defined after the mold 20 is removed (as shown in FIG. 5). Such net shape molding eliminates the need for any further shaping of the inside surface 54 of the tiles 24 after the mold 20 is removed provided that the individual tiles 24 are formed to have a contour conformably matched to a contour of the outside surface 22 of the mold. In certain embodiments it may be desired to perform a mechanical process such as machining, grinding, sanding, or other shaping of the inside surface 54 after the mold 20 is removed. This may be desired if the tiles 24 are formed to have a flat inner contour, for example, which may be desired in order to ease the manufacturing of the tiles 24. However, for embodiments such as a combustor transition duct wherein the inside surface 54 defines a relatively long, narrow passageway 52, it may be beneficial to form the mold 20 to have a desired net shape or near net shape and to use conforming tiles 24 so that such further mechanical processing of the interior surface is eliminated or minimized.

Figure 3:
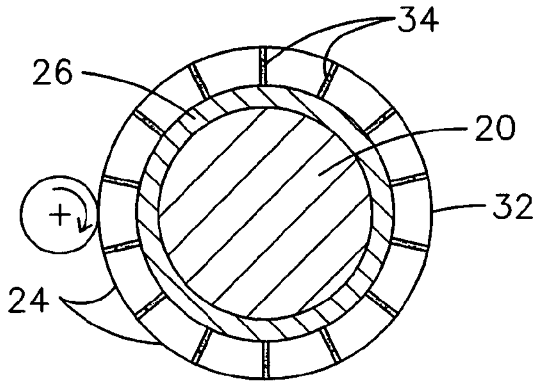

After the tiles 24 are affixed to the mold 20, the outside surface 32 of the tiles 24 may be prepared, such as by machining, sanding, grinding, etc., to achieve a desired surface profile, as illustrated in FIG. 3. The mold 20 provides mechanical support for the tiles 24 during any such mechanical process performed to the tiles 24. Alternatively, the outer surface 32 of the tiles 24 may be formed to have a desired contour without further shaping.

Figure 4:
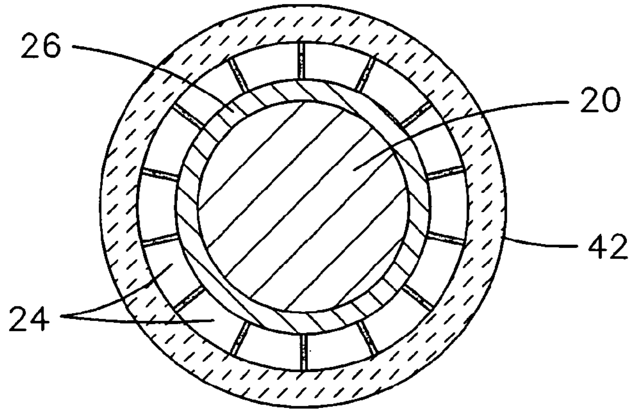

Gaps between adjacent tiles 24 may be left unfilled to accommodate thermal expansion, or they may be filled with an appropriate filler material 34. An adhesive or insulating ceramic matrix slurry may be applied to fill the gaps from the outside surface 32 while it is exposed and the mold 20 is in place. A layer of ceramic matrix composite (CMC) material 42 is then formed over the ceramic tiles 24, as illustrated in FIG. 4, to bond the plurality of ceramic tiles 24 together with the ceramic matrix composite material 42. The CMC material 42 may be any known oxide or non-oxide composite. The mold 20 remains in place for mechanically supporting the tiles 24 during the lay-up and drying of the CMC material 42 and during any subsequent mechanical step, such as handling, machining, grinding, sand blasting, etc. It may be desired to at least partially cure the ceramic tiles 24 and filler material 34 prior to applying the layer of CMC material 42 and/or to at least partially cure the CMC material 42 prior to removing the mold 20. The curing temperature during such steps must be less than a transformation temperature of the fugitive material portion 26 of the mold 20 if the fugitive material is one that is transformed by heat so that the mechanical support provided by the mold is maintained.

The layer of ceramic matrix composite material 42 then provides adequate mechanical support for the layer of ceramic tiles 24, thereby allowing the mold tooling to be removed for further processing. Alternatively, the mold 20 may remain in place through the entire processing of the hybrid structure 50. At an appropriate point in the manufacturing process, the fugitive material portion 26 of mold 20 is transformed, the mold 20 removed, and the hybrid structure 50 processed to its final configuration as shown in FIG. 5. If the gaps between the tiles 24 had not previously been filled from the outside surface 32 prior to the application of the layer of CMC material 42, such gaps may be filled from the passageway side after the mold 20 has been removed. The filler material 34, ceramic tiles 24 and CMC material 42 may be subjected to a final firing process as required prior to use in a high temperature environment.

If the fugitive material 26 is not stable at a desired interim firing temperature, the mold 20 may be removed prior to an interim firing step, and a second mold may be installed after the interim firing for support during a subsequent mechanical processing step. The fugitive material portions 26 of the first and second inner molds 20 do not necessarily have to be the same material.

The ceramic tiles 24 may all have the same composition (i.e. chemistry, microstructure, etc.) and size, or tiles having different compositions and/or dimensions may be applied over selected portions of the mold surface 22. This may prove advantageous for applications such as a gas turbine combustor transition duct where the conditions to which the exposed surface of the various tiles 24 are subjected during use of the composite structure 50 will vary depending upon the location of the specific tile 24 within the structure 50. For example, tiles 24 located at a bend location within a gas turbine combustor transition duct may be exposed to greater erosion forces than tiles 24 located along a straight section of the duct. Accordingly, tiles 24 having a greater thickness or a more erosion-resistant composition may be desired in the bend area. Adjacent tiles may also be designed to interlock and/or to overlap to improve continuity or structural integrity. More than one layer of tiles may be applied to all or portions of the mold, with the composition and/or dimensions of the tiles of the various layers not necessarily being the same. The gaps between adjacent tiles of overlapping layers may be staggered so as not to be aligned with each other.

Additionally, the gaps between the tiles may be left unfilled, partially filled or filled with a different material such that the gaps act as stress relieving junctions. At least a portion of the tiles may undergo a surface preparation with either a surface contour operation and/or a surface coating material either before being applied to the mold and/or before the application of the CMC material and/or after the removal of the mold. For example, at least some of the tiles may have surface features, such as lines scribed by laser energy for example, to minimize thermal strains/stresses that could cause the tiles to fail by spallation or other mechanisms. The tile surface that is to be exposed to the hot and/or corrosive environment during use may be pre-coated with an erosion resistant or environmental resistant surface coating material. The tile surface exposed to the CMC material may be processed to include surface features such as specifically sized and shaped asperities that facilitate improved mechanical/chemical bonding of the CMC to the tile. These are only some examples of how the tile gaps may be used and how the tile surfaces may be prepared to improve the performance of the final product. Those skilled in the art may find other such modifications advantageous in a particular application.

One may appreciate that the present invention may be used for other applications where insulating ceramic tiles are disposed on an exterior surface of a ceramic matrix composite structural member. The present invention eliminates the need for casting, handling and processing large, unwieldy shapes of low-strength ceramic insulating materials, and it facilitates the fabrication of complex shapes with insulation on an interior surface where machining would otherwise be difficult or impossible. The present invention may also be used with tiles other than thermally insulating tiles, such as tiles made of materials specifically selected to improve erosion and/or corrosion resistance, for instance. In one embodiment, $Si_3N_4$ tiles may be applied to a non-oxide CMC substrate.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method of manufacturing a hybrid structure comprising:

applying a plurality of ceramic tiles to a surface of a mold;

applying a layer of ceramic matrix composite material over the ceramic tiles to bond the plurality of ceramic tiles together with the ceramic matrix composite material; and removing the mold;

further comprising machining an inside surface of the plurality of ceramic tiles to a desired contour after the step of removing the mold.

2. The method of claim 1, further comprising forming the ceramic tiles to comprise a contour conformably matched to a contour of the surface of the mold.

3. The method of claim 1, further comprising forming the mold to comprise a fugitive material portion.

4. The method of claim 1, further comprising machining an outer surface of the plurality of tiles with the tiles supported by the mold prior to the step of applying the layer of ceramic matrix composite material.

5. The method of claim 1, further comprising at least partially filling gaps between adjacent tiles with a filler material prior to the step of applying a layer of ceramic matrix composite material over the ceramic tiles.

6. The method of claim 1, further comprising at least partially filling gaps between adjacent files with a filler material after the step of removing the mold.

7. The method of claim 1, further comprising:

filling gaps between adjacent tiles with a filler material after the step of removing the mold; and firing the tiles, the ceramic matrix composite material and the filler material together to form a hybrid structure for use in a high temperature environment.

8. The method of claim 1, further comprising:

applying ceramic tiles having a first composition to a first portion of the surface of the mold; and applying ceramic tiles having a second composition different than the first composition to a second portion of the surface of the mold.

9. The method of claim 1, further comprising preparing a surface of at least a portion of the tiles with a surface contour operation.

10. The method of claim 1, further comprising preparing a surface of at least a portion of the tiles by applying a surface coating material.

11. A method of manufacturing a gas turbine combustor component comprising a ceramic matrix composite structural member having a layer of ceramic insulating material disposed on an inside surface and defining a passageway for hot combustion gasses, the method comprising:

providing a mold comprising a fugitive material;

applying ceramic tiles having a first composition to a first portion of surface of the mold; and applying ceramic tiles having a second composition different than the first composition to a second portion of the surface of the mold;

applying a layer of ceramic matrix composite material over the ceramic insulating tiles to bond The tiles together with the ceramic matrix composite material; and transforming the fugitive material and removing the mold.

12. The method of claim 11, further comprising:

filling gaps between the tiles with a ceramic filler material; and firing the tiles, the ceramic matrix composite material and the filler material together after the step of removing the mold.

13. The method of claim 12, further comprising filling the gaps prior to the step of applying the layer of ceramic matrix composite material over the tiles.

14. The method of claim 12, further comprising filling the gaps after the step of removing the mold.

15. The method of claim 11, further comprising forming the ceramic tiles to comprise a contour conformably matched to a contour of the surface of the mold.

16. The method of claim 11, further comprising machining an outer surface of the plurality of tiles with the tiles supported by the mold prior to the step of applying the layer of ceramic matrix composite material.

17. The method of claim 11, further comprising machining an inside surface of the plurality of ceramic tiles to a desired contour after the step of removing the mold.

18. The method of claim 11, further comprising preparing a surface of at least a portion of the tiles with a surface contour operation.

19. The method of claim 11, further comprising preparing a surface of at least a portion of the tiles by applying a surface coating material.

20. A method of manufacturing a hybrid structure for a gas turbine component comprising a generally tubular shape defining an interior passageway through which hot combustion gasses will flow, the method comprising:

providing a mold comprising an outside surface corresponding to a shape of the interior passageway of the gas turbine component;

affixing a plurality of ceramic insulating tiles to the outside surface of the mold;

mechanically preparing an exposed surface of the tiles to achieve a desired surface profile after the tiles are affixed to the mold so that the mold provides mechanical support for the tiles during the preparing step;

forming a layer of ceramic matrix composite material over the ceramic tiles and bonding the tiles together with the layer of ceramic matrix composite material to form a hybrid structure; and removing the mold after the tiles are bonded to the layer of ceramic matrix composite material; and processing the hybrid structure to a final configuration after the mold has been removed.

21. The method of claim 20, wherein the step of mechanically preparing comprises one of the group of machining, grinding and sanding of the exposed surface of the tiles.

22. The method of claim 20, further comprising at least partially filing gaps between adjacent tiles after the tiles are affixed to the mold so that the mold provides mechanical support for the tiles during the filing step.

23. A method of manufacturing a hybrid structure for a gas turbine component comprising a generally tubular shape defining an interior passageway through which hot combustion gasses will flow, the method comprising:

providing a mold comprising an outside surface corresponding to a shape of the interior passageway of the gas turbine component;

affixing a plurality of ceramic insulating tiles to the outside surface of the mold;

at least partially filling gaps between adjacent tiles with a grout material after the tiles are affixed to the mold so that the mold provides mechanical support for the tiles during the grouting step;

forming a layer of ceramic matrix composite material over The grouted ceramic tiles and at least partially curing the tiles together with the grout and the layer of ceramic matrix composite material to form a hybrid structure; and removing the mold after the tiles and grout material are bonded to the layer of ceramic matrix composite material; and processing the hybrid structure to a final configuration after the mold has been removed.

24. A method of manufacturing a hybrid structure comprising:

applying a plurality of ceramic tiles to a surface of a mold with gaps between adjacent tiles being left unfilled;

applying a layer of ceramic matrix composite material over the ceramic tiles and gaps;

drying and at least partially curing the ceramic matrix composite material to bond the tiles and ceramic matrix composite material together, the gaps between adjacent tiles being effective as stress relieving junctions during the drying and curing step;

removing the mold;

at least partially filling the gaps between adjacent tiles with filler material to form the hybrid structure; and final firing the hybrid structure.

* * * * *